US010228560B2

(12) United States Patent
Li et al.

(10) Patent No.: US 10,228,560 B2
(45) Date of Patent: Mar. 12, 2019

(54) REMOTE CONTROL DEVICE, REMOTE CONTROL PRODUCT AND REMOTE CONTROL METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Youze Li, Beijing (CN); Yufeng Du, Beijing (CN); Ruifeng Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/679,142

(22) Filed: Aug. 16, 2017

(65) Prior Publication Data
US 2018/0143432 A1    May 24, 2018

(30) Foreign Application Priority Data
Nov. 24, 2016    (CN) .......................... 2016 1 1053371

(51) Int. Cl.
*G09G 5/00*    (2006.01)
*G02B 27/01*    (2006.01)
(Continued)

(52) U.S. Cl.
CPC ....... *G02B 27/017* (2013.01); *G02B 27/0093* (2013.01); *G06F 3/012* (2013.01); *G06F 3/013* (2013.01); *G02B 2027/0178* (2013.01)

(58) Field of Classification Search
CPC ........ G06F 3/013; G06F 3/012; G06F 3/0304; G06F 21/32; G06F 21/64; G06F 3/04842;
(Continued)

(56) References Cited

U.S. PATENT DOCUMENTS

| 9,292,086 B2* | 3/2016 | Jahnke | G06F 3/013 |
| 2016/0048249 A1* | 2/2016 | Chen | G06F 3/011 |
| | | | 701/2 |

* cited by examiner

*Primary Examiner* — Duc Q Dinh
(74) *Attorney, Agent, or Firm* — Kinney & Lange, P.A.

(57) ABSTRACT

Embodiments of the present disclosure relate to a remote control device and a remote control product, which belong to the field of the electronic technology. The remote control device includes a device body, a processing assembly, an eye information collecting assembly and an environment information collecting assembly. The processing assembly, the eye information collecting assembly and the environment information collecting assembly are arranged on the device body, and the eye information collecting assembly and the environment information collecting assembly are electrically connected to the processing assembly respectively. The eye information collecting assembly is configured to collect a user's eye information; and the environment information collecting assembly is configured to collect environment information of the environment in front of the user; and the processing assembly is configured to determine the device to be controlled based on the eye information and the environment information and control the device to be controlled.

18 Claims, 11 Drawing Sheets

(51) Int. Cl.
*G06F 3/01* (2006.01)
*G02B 27/00* (2006.01)

(58) Field of Classification Search
CPC .............. G06F 1/163; G06F 2203/0384; G06F 3/0346; G02B 27/017; G02B 27/0093; G02B 2027/0138; G02B 27/01; G02B 27/0179; G02B 2027/014; G02B 2027/0178; G02B 27/022; G08C 2201/91; G08C 2201/92; H04W 12/06; H04L 63/0861; G09G 2330/08; G09G 2340/12; G09G 2370/022; G09G 2370/16; G09G 2380/12; G09G 3/002; G09G 3/003; G09G 5/00; G09G 5/14; G09G 2350/00; H04N 13/344; H04N 5/7491
USPC ........................................................ 345/7–9
See application file for complete search history.

REMOTE CONTROL DEVICE, REMOTE CONTROL PRODUCT AND REMOTE CONTROL METHOD

CROSS-REFERENCE TO RELATED APPLICATION

This application claims the benefit of Chinese Patent Application 201611053371.1 filed on Nov. 24, 2016 in the State Intellectual Property Office of China, the whole disclosure of which is incorporated herein by reference.

TECHNICAL FIELD

The present disclosure relates to the field of electronic technology, and particularly to a remote control device, a remote control product and a remote control method.

DESCRIPTION OF THE RELATED ART

With the development of electronic technology, electronic devices based on electronic technology are increasingly popular in people's lives. Electronic devices are usually equipped with remote controls, so the user can control the electronic device through the remote controls.

In the prior art, the remote control includes a remote control body and a remote control button. The remote control body is usually a hand-held structure. The remote control button is provided on the remote control body. When the remote control is used to control the electronic device, the user may hold the remote control body and aims the remote control at an electronic device to be controlled, and then presses a corresponding remote control button, so that the remote control sends out a corresponding remote control signal to control the electronic device. For example, the electronic device may be a TV A. When the TV A is in an off state, the user may hold the remote control body, and aims the remote control at the TV A, and then presses a switch button on the remote control such that the remote control sends out a remote control signal to turn on the TV A; when the TV A is in an on state, the user may hold the remote control body, and aims the remote control at the TV A, and then press a volume adjustment button on the remote control, such that the remote control sends out a volume adjustment signal to adjust the volume of TV A.

There are at least following problems in the prior art:

when the remote control in the prior art is used to control an electronic device, it is necessary for the user to hold the remote control body and to aim the remote control at the electronic device and press the remote control button. Therefore, the operation process of controlling the electronic device with the remote control is complicated.

SUMMARY

In order to solve the problem of operating the electronic device complicatedly by using the remote controller, the present disclosure provides a remote control device and a remote control product.

According to an aspect of the present disclosure, there is provided a remote control device comprising: a device body, a processing assembly, an eye information collecting assembly and an environment information collecting assembly, wherein the processing assembly, the eye information collecting assembly and the environment information collecting assembly are arranged on the device body, and the eye information collecting assembly and the environment information collecting assembly are electrically connected to the processing assembly respectively, and wherein the eye information collecting assembly is configured to collect a user's eye information; and the environment information collecting assembly is configured to collect environment information of the environment in front of the user; and wherein the processing assembly is configured to determine the device to be controlled based on the eye information and the environment information and control the device to be controlled.

Optionally, the device body is a wearable structure, the eye information collecting assembly being provided inside the device body, the environment information collecting assembly being provided outside the device body, and wherein the eye information collecting assembly faces the user's eye and the environment information collecting assembly faces the environment in front of the user, when the device body is worn by user.

Optionally, the eye information collecting assembly is an eye image collecting assembly, the eye information being an eye image, and the environment information collecting assembly is a distance collecting assembly, and wherein the processing assembly is configured to determine an orientation of an eyeball based on the eye image, determine a direction of sight based on the orientation of the eyeball, and determine a device located in the direction of sight as a gazed device and obtain at least one gazed device, and wherein the orientation of the eyeball is characterized by an offset value of a current pupil position relative to the preset reference pupil position; and the processing assembly is further configured to determine a size of the pupil based on the eye image and to determine a gazing distance based on the size of the pupil; the distance collecting assembly is configured to collect a measurement distance between each of the at least one gazed device and the remote control device; and the processing assembly is further configured to determine the device to be controlled in the at least one gazed device, based on the gazing distance and the measurement distance between each of the at least one gazed device and the remote control device.

Optionally, the eye information collecting assembly is an eye image collecting assembly, the eye information being an eye image, and the environment information collecting assembly is an environment image collecting assembly, and wherein the processing assembly is configured to determine an orientation of an eyeball based on the eye image, determine a direction of sight based on the orientation of the eyeball, and determine a device located in the direction of sight as a gazed device and obtain at least one gazed device, and wherein the orientation of the eyeball is characterized by an offset value of a current pupil position relative to the preset reference pupil position; and the processing assembly is further configured to determine a size of the pupil based on the eye image and to determine a gazing distance based on size of the pupil; the environment image collecting assembly is configured to collect an environment image of the environment in front of the user, which includes an image of the at least one gazed device; the processing assembly is further configured to determine a measurement distance between each of the at least one gazed device and the remote control device based on the environment image; and the processing assembly is further configured to determine the device to be controlled in the at least one gazed device, based on the gazing distance and the measurement distance between each of the at least one gazed device and the remote control device.

Optionally, the processing assembly is further configured to select one of the at least one gazed device whose measure distance is closest to the gazing distance as the device to be controlled.

Optionally, the remote control device further comprises a verification information collection assembly provided on the device body and electrically connected to the processing assembly respectively; the verification information collecting assembly is configured to collect the user's verification information, and the verification information is configured to verify control right of the user to the device to be controlled; and the processing assembly is configured to verify the user based on the verification information and to allow control to the device to be controlled after verification is successful.

Optionally, the remote control device further comprises a verification information collection assembly and a communication assembly which are both provided on the device body, and the communication assembly is electrically connected to the verification information collection assembly and the processing assembly respectively; the verification information collecting assembly is configured to collect the user's verification information and transmit the verification information to the device to be controlled through the communication assembly, such that the device to be controlled verifies the user based on the verification information, the verification information being configured to verify a control right of the user to the device to be controlled; and the processing assembly is configured to allow control to the device to be controlled after the device to be controlled has successfully verified the user.

Optionally, the remote control device further comprises a verification information collection assembly and a communication assembly which are both provided on the device body, and the communication assembly is electrically connected to the verification information collection assembly and the processing assembly respectively; the verification information collecting assembly is configured to collect the user's verification information and transmit the verification information to a verifying device through the communication assembly, such that the verifying device verifies the user based on the verification information, the verification information being configured to verify the control right of the user to the device to be controlled; and the processing assembly is configured to allow control to the device to be controlled after the verifying device has successfully verified the user.

Optionally, the remote control device further comprises a presentation assembly provided on the device body and electrically connected to the processing assembly respectively; and the presentation assembly is configured to present information of the device to be controlled.

According to another aspect of the present disclosure, there is provided a remote control product, comprising a device to be controlled and the above mentioned remote control device.

According to yet another aspect of the present disclosure, there is provided a remote control method for a remote control device, the method comprising:

collecting the user's eye information;

collecting environment information of the environment in front of the user;

determining a device to be controlled based on the eye information and the environment information; and controlling the device to be controlled.

Optionally, the eye information is an eye image, and the environment information is a measurement distance between each of at least one gazed device and the remote control device, determining a device to be controlled based on the eye information and the environment information comprises:

determining an orientation of eyeball based on the eye image, the orientation of eyeball is characterized by an offset value of the current pupil position relative to a preset reference pupil position;

determining a direction of sight based on the orientation of the eyeball;

determining a device located in the direction of sight as a gazed device and obtaining the at least one gazed device, determining a size of the pupil based on the eye image, determining a gazing distance based on the size of the pupil, and determining the device to be controlled in the at least one gazed device based on a gazing distance and a measurement distance between each of the gazed device in the at least one gazed device and the remote control device.

Optionally, the eye information is an eye image, and the environment information is an environment image which comprises an image of the at least one gazed device, wherein determining a device to be controlled based on the eye information and the environment information comprises:

determining an orientation of eyeball based on the eye image, the orientation of eyeball is characterized by an offset value of the current pupil position relative to a preset reference pupil position;

determining a direction of sight based on the orientation of the eyeball;

determining a device located in the direction of sight as a gazed device and obtaining the at least one gazed device, determining a size of the pupil based on the eye image, determining a gazing distance based on the size of the pupil, determining a measurement distance between each of the at least one gazed device and the remote control device based on the environment image; and determining the device to be controlled in the at least one gazed device based on a gazing distance and a measurement distance between each of the gazed device in the at least one gazed device and the remote control device.

Optionally, determining the device to be controlled in the at least one gazed device based on a gazing distance and a measurement distance between each of the gazed device in the at least one gazed device and the remote control device, comprises selecting one of the at least one gazed device whose measure distance is closest to the gazing distance as the device to be controlled.

Optionally, before controlling the device to be controlled, the method further comprises:

collecting the user's verification information, and the verification information is configured to verify a control right of the user to the device to be controlled; and verifying the user based on the verification information;

wherein controlling the device to be controlled comprises allowing control to the device to be controlled after verification is successful.

Optionally, before controlling the device to be controlled, the method further comprises:

collecting the user's verification information, and the verification information is configured to verify a control right of the user to the device to be controlled; and transmitting the verification information to the device to be controlled, such that the device to be controlled verifies the user based on the verification information;

wherein controlling the device to be controlled comprises:

allowing control to the device to be controlled after the verification of the device to be controlled to the user is successful.

Optionally, before controlling the device to be controlled, the method further comprises:

collecting the user's verification information, and the verification information is configured to verify a control right of the user to the device to be controlled; and transmitting the verification information to the verifying device, such that the verifying device verifies the user based on the verification information;

wherein controlling the device to be controlled comprises:

allowing control to the device to be controlled after the verification of the verifying device to the user is successful.

Optionally, after determining the device to be controlled based on the eye information and the environment information, the method further comprises:

presenting information of the device to be controlled.

According to yet another aspect of the present disclosure, there is provided a remote control means for the above remote control device, comprising:

a first collecting module for collecting a user's eye information;

a second collecting module for collecting environment information of the environment in front of the user;

a determination module for determining a device to be controlled based on the eye information and the environment information; and a control module for controlling the device to be controlled.

Optionally, the eye information is an eye image and the environment information is a measurement distance between each of at least one gazed device and the remote control device, the determining module being configured to:

determine orientation of an eyeball based on the eye image, the orientation of the eyeball being characterized by an offset value of a current pupil position relative to a preset reference pupil position;

determine a direction of sight based on the orientation of the eyeball;

determine a device located in the direction of sight as a gazed device and obtain the at least one gazed device;

determine a size of the pupil based on the eye image;

determine a gazing distance based on the size of the pupil; and determine the device to be controlled in the at least one gazed device, based on the gazing distance and the measurement distance between each of the at least one gazed device and the remote control device.

Optionally, the eye information is an eye image and the environment information is an environment image, the determining module being configured to:

determine an orientation of an eyeball based on the eye image, the orientation of the eyeball being characterized by an offset value of a current pupil position relative to a preset reference pupil position;

determine a direction of sight based on the orientation of the eyeball;

determine a device located in the direction of sight as a gazed device and obtain the at least one gazed device;

determine a size of the pupil based on the eye image;

determine a gazing distance based on the size of the pupil;

determine a measurement distance between each of the at least one gazed device and the remote control device based on the environment image; and determine the device to be controlled in the at least one gazed device, based on the gazing distance and the measurement distance between each of the at least one gazed device and the remote control device.

Optionally, the determining module is configured to select one of the at least one gazed device whose measure distance is closest to the gazing distance as the device to be controlled.

Optionally, the remote control means further comprises:

a third collecting module configured to collect the user's verification information, the verification information being configured to verify a control right of the user to the device to be controlled; and a first verifying module configured to verify the user based on the verification information, wherein the control module is configured to allow control to the device to be controlled after verification is successful.

Optionally, the remote control means further comprises:

a fourth collecting module configured to collect the user's verification information, and the verification information is configured to verify a control right of the user to the device to be controlled; and a first transmitting module configured to transmit the verification information to the device to be controlled, so as to cause the device to be controlled to verify the user based on the verification information; and wherein the control module is further configured to control the device to be controlled after the verification of the device to be controlled to the user is successful.

Optionally, the remote control means further comprises:

a fifth collecting module configured to collect the user's verification information, and the verification information is configured to verify a control right of the user to the device to be controlled;

a second transmitting module configured to transmit the verification information to a verifying device, so as to cause the verifying device to verify the user based on the verification information; and wherein the control module is further configured to control the device to be controlled after the verification of the verifying device to the user is successful.

Optionally, the remote control means further comprises: a presentation module configured to present information of the device to be controlled.

BRIEF DESCRIPTION OF THE DRAWINGS

In order to illustrate the technical solution in the embodiments of the present disclosure more clearly, the following drawings, which are intended to be used in the description of the embodiments, are briefly described. It will be apparent that the drawings in the following description are merely exemplary embodiments of the present disclosure. Other drawings may be obtained by those skilled in the art without an inventive effort. The drawings herein are incorporated into the specification and constitute a part thereof, which show embodiments consistent with the present disclosure and serve to explain the principles of the disclosure together with the description.

FIG. 1-2 is a schematic diagram of a remote control device in the embodiment shown in FIG. 1-1 which controlls a device to be controlled;

FIG. 2 is a schematic structural view of a remote control product according to an embodiment of the present disclosure;

FIG. 3-1 is a flow chart of a remote control method according to an embodiment of the present disclosure;

FIG. 3-2 is a flow chart of a method for determining a device to be controlled in the remote control method provided by the embodiment shown in FIG. 3-1;

FIG. 3-3 is a flow chart of another method for determining a device to be controlled in the remote control method provided by the embodiment shown in FIG. 3-1;

FIG. 3-4 is a flow chart of a method for verifying a user in the remote control method provided by the embodiment shown in FIG. 3-1;

FIG. 3-5 is a flow chart of a method for verifying a user in the remote control method provided by the embodiment shown in FIG. 3-1;

FIG. 3-6 is a flow chart of another method for verifying a user in the remote control method provided by the embodiment shown in FIG. 3-1;

FIG. 4-1 is a block diagram of a remote control means according to an embodiment of the present disclosure;

FIG. 4-2 is a block diagram of another remote control means according to an embodiment of the present disclosure;

FIG. 4-3 is a block diagram of yet another remote control means according to an embodiment of the present disclosure; and FIG. 4-4 is a block diagram of yet another remote control means according to an embodiment of the present disclosure.

DETAILED DESCRIPTION OF PREFERRED EMBODIMENTS

In order that the objects, technical solutions and advantages of the present disclosure will become more apparent, the present disclosure will be further described in detail in conjunction with the accompanying drawings. It is obvious that the described embodiments are merely part of the present disclosure and not all of embodiments All other embodiments obtained by those of ordinary skill in the art without an inventive effort are within the scope of the present disclosure, based on embodiments in the present disclosure.

Figure 1:
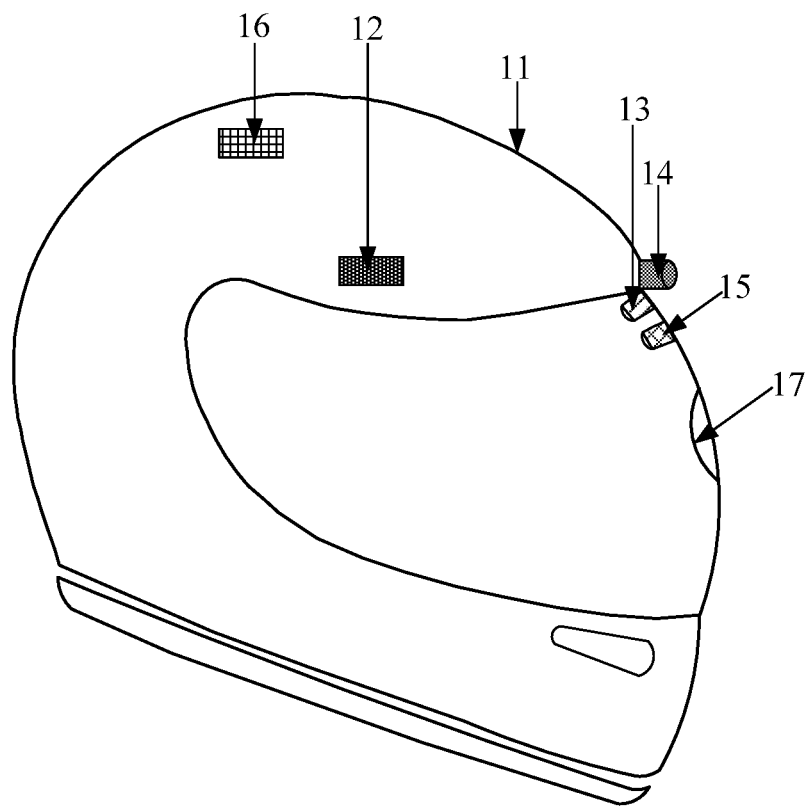
FIG. 1-1 is a schematic diagram of a remote control device according to an embodiment of the present disclosure.

Now referring to FIG. 1-1, which shows a schematic diagram of a remote control device 10 according to an embodiment of the present disclosure, the remote control device 10 comprises: a device body 11, a processing assembly 12, an eye information collecting assembly 13 and an environment information collecting assembly 14.

The processing assembly 12, the eye information collecting assembly 13 and the environment information collecting assembly 14 are arranged on the device body 11, and the eye information collecting assembly 13 and the environment information collecting assembly 14 are electrically connected to the processing assembly 12 respectively. The eye information collecting assembly 13 is configured to collect a user's eye information and the environment information collecting assembly 14 is configured to collect environment information of the environment in front of the user; the processing assembly 12 is configured to determine the device to be controlled based on the eye information and the environment information and control the device to be controlled.

As the remote control device provided by the present disclosure may determine a device to be controlled based on the user's eye information and the environment information of the environment in front of the user and control the device to be controlled, the remote control device may control the device to be controlled without the need for users to manually operate the remote control device, which solves the problem that the operation process to control the device to be controlled with a remote control is complicated, simplifying the operation process to control the device to be controlled.

Further, in an embodiment of the present disclosure, the device body 10 is a wearable structure and optionally a wearable structure capable of being worn on a user's head, such as an eyeglass and a helmet. The eye information collecting assembly 13 is provided inside the device body 11, the environment information collecting assembly 14 is provided outside the device body 11. The eye information collecting assembly 13 faces the user's eye and the environment information collecting assembly 14 faces the environment in front of the user, when the device body 11 is worn by the user.

Further, in an embodiment of the present disclosure, the eye information collecting assembly 13 may be an eye image collecting assembly, and the eye information may be an eye image. The environment information collecting assembly 14 may be a distance collecting assembly or an environment image collecting assembly. The eye image collecting assembly may be specifically a camera, which is preferably a wide-angle camera. The wide-angle camera has a large viewing angle range and the user's eye image can be effectively collected even if the distance between the wide-angle camera and the user's eye is small. In case that the environment information collecting assembly 14 is a distance collecting assembly, the environment information collecting module 14 may be an infrared ray distance measuring sensor, a microwave distance measuring sensor, an ultrasonic distance measuring sensor, or a laser distance measuring sensor. In case that the environment information collecting unit 14 is an environment image collecting assembly, the environment information collecting unit 14 may be a camera. Now, the embodiments of the eye information collecting means 13 being an eye image collecting assembly and the environment information collecting assembly 14 being a distance collecting assembly or an environment image collecting assembly will be described as an example, respectively.

According to an embodiment of the disclosure, the eye information collecting means 13 is an eye image collecting assembly and the environment information collecting assembly 14 is a distance collecting assembly.

The eye image collecting assembly 13 is configured to collect user's eye information. For example, the eye image collecting assembly collects the user's eye image by photographing.

Figures 1, 2:
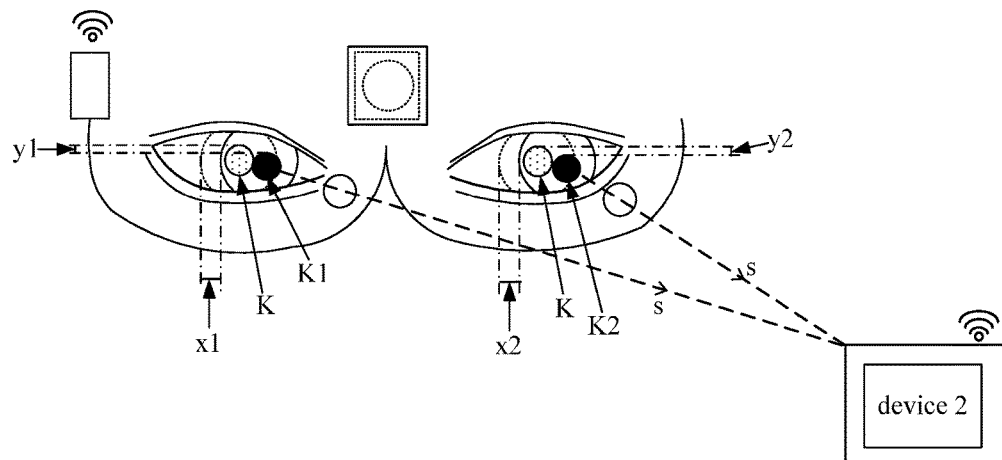
Figure 2:
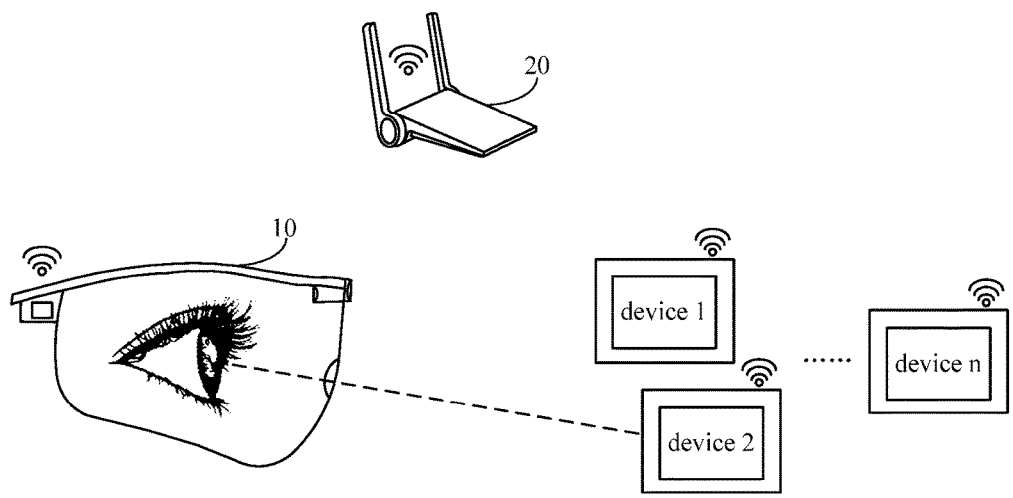

The processing assembly 13 is configured to determine orientation of an eyeball based on the eye image, determine a direction of sight based on the orientation of the eyeball, and determine a device located in the direction of sight as a gazed device and obtain at least one gazed device. The orientation of the eyeball is characterized by an offset value of a current pupil position relative to the preset reference pupil position. The reference pupil position may be the position where the pupil is located at the center of eye, or may be the position where the pupil is located at any other position of the eye. The reference pupil position may be different for different users. The processing assembly 13 may determine the reference pupil position by machine learning, or determine the reference pupil position according to a human eye standard template, without limiting thereto in the present disclosure. Optionally, the processing assembly 13 may determine the orientation of the left eyeball and the orientation of the right eyeball, respectively, and then determine a direction of sight based on the orientations of the left and right eyeballs, and determine a device in the direction of sight as a gazed device. By way of example, as shown in FIG. 1-2, the orientation of the right eyeball can be characterized by an offset value of the current pupil position K1 of the right eye relative to the preset reference pupil position K of the right eye. The offset value of the current pupil position K1 of the right eye relative to the preset reference pupil position K of the right eye may include a offset value x1 on the x-axis and a offset value y1 on the y-axis. Similarly, the offset value of the current pupil position K2 of the left eye relative to the preset reference pupil position K of the left eye may include an offset value x2 on the x-axis and a offset value y2 on the y-axis. The processing assembly may determine the direction of sight s based on the orientations of the left and right eyeballs together, and determine the device 2 located in the direction of sight s as the gazed device. It should be noted that FIG. 1-2 is described taking the case in which there is one device located in the direction of sight s as an example. In practice, there may be a plurality of devices located in the direction of sight, so that the processing assembly may determine at least one gazed device, which will not be described here.

The processing assembly 13 is further configured to determine a size of the pupil based on the eye image and to determine a gazing distance based on the size of the pupil. The eye image collected by the eye image collecting assembly includes a pupil image. The processing assembly 13 may determine the ratio of size of the pupil image to the eye image based on the eye image, and then obtain the focal length used when the eye image collecting assembly collects the eye image, and then calculate the actual size of the eye based on the focal length, and then calculate the actual size of the pupil, that is, the pupil size, based on the actual size of the eye and the ratio of size of the pupil image to the eye image. Further, the size of the pupil is different when the human eye is gazing different distances. The processing assembly 13 may store a correspondence relationship between the pupil size and the gazing distance, which is used to indicate the pupil size when it is gazing a corresponding distance. After calculating the pupil size, the processing assembly 13 may look up the correspondence relationship between such a pupil size and the gazing distance so as to obtain a distance corresponding to the pupil size and use the distance corresponding to the pupil size as the corresponding gazing distance. It is to be noted that, in the embodiment of the present disclosure, the correspondence relationship between the pupil size and the gazing distance may be configured to the remote control device 10 before it is laid off, or may be determined by the processing assembly 13 through a machine learning method, to which there is no limitation in the present disclosure.

The environment information collecting assembly 14 is a distance collecting assembly configured to collect a measurement distance between each of the at least one gazed device determined by the processing assembly 13 and the remote control device 10. By way of example, the distance collecting assembly is an infrared ray distance measuring sensor, and the gazed device is the device 2 in FIG. 1-2. The infrared ray distance measuring sensor may include an infrared ray transmitting tube and an infrared ray receiving tube. The infrared ray transmitting tube is configured to emit an infrared light to the device 2. When the infrared light is irradiated onto the device 2, the device 2 reflects the infrared light. The reflected infrared light reaches the infrared ray receiving tube and is received by the infrared ray receiving tube. The propagation time period of the infrared light is calculated based on the time at which the infrared light is emitted and the time at which the infrared light is received and the measurement distance between the infrared distance measuring sensor and the device 2 is calculated by combining the speed of light. Then the measurement distance between the infrared ray distance measuring sensor and the device 2 is used as the measurement distance between the remote control device 10 and the device 2.

The processing assembly 13 is further configured to determine the device to be controlled in the at least one gazed device, based on the gazing distance and the measurement distance between each of the at least one gazed device and the remote control device 10. Optionally, the processing assembly 13 may select a device among the at least one gazed devices, for which the measurement distance and the gazing distance is closest, as the device to be controlled. In particular, the distance collecting assembly may determine at least one measurement distance, each measurement distance corresponding to a gazed device, and the processing assembly 13 may compare each of the at least one measurement distance with a gazing distance, and determine a measurement distance which is closest to the gazing distance based on the comparison result, and determine the gazed device corresponding to the measurement distance which is closest to the gazing distance as the device to be controlled. By way of example, it is assumed that the at least one gazed device includes a device 1, a device 2 and a device 3, and that the measurement distance between the device 1 and the remote control device 10 is a, the measurement distance between the device 2 and the remote control device 10 is b, and the measurement distance between the device 3 and the remote control device 10 is c. It is further assumed that the gazing distance is b1, and b is closest to b1. Then the processing assembly 13 determines the device 2 as a device to be controlled.

According to another embodiment of the disclosure, the eye information collecting assembly 13 is an eye image collecting assembly, and the environment information collecting assembly 14 is an environment image collecting assembly.

The eye image collecting assembly is configured to collect user's eye image. The processing assembly 13 is configured to determine orientation of an eyeball based on the eye image, determine a direction of sight based on the orientation of the eyeball, and determine a device located in the direction of sight as the gazed device and obtain the at least one gazed device. The orientation of the eyeball is characterized by an offset value of a current pupil position relative to the preset reference pupil position. The processing assembly 13 is further configured to determine a size of the pupil based on the eye image and to determine a gazing distance based on the size of the pupil. The implementation of this process can refer to the above disclosure, which will not be described here further.

The environment information collecting assembly 14 is an environment image collecting assembly configured to collect an environment image in front of a user, which includes an image of the at least one gazed device. The environment image collecting assembly may be directed towards an environment in front of the user in which at least one gazed device is included. Therefore, the environment image in front of the user which is collected by the environment image collecting assembly may include an image of at least one gazed device. In the embodiment of the present disclosure, the environment image capturing assembly may be a camera facing the environment in front of the user. The camera may collect an environment image in front of the user by photographing, and can be focused actively or passively, to which there is no limitation.

The processing assembly 13 is further configured to determine a measurement distance between each of the at least one gazed device and the remote control device based on the environment image. Optionally, the processing assembly 13 may determine the ratio of size of the image of each of the at least one gazed device and the environment image according to the environment image, and then obtains the focal length used by the camera when capturing the environment image, and further, based on the focal length and the ratio of size of the image of each of the at least one gazed device and the environment image, calculates the measurement distance between each of the gazed devices and the camera, and determines the measurement distance between each of the gazed devices and the camera as the measurement distance between each of the gazed devices and the remote control device 10, to which there is no limitation.

The processing assembly is further configured to determine the device to be controlled in the at least one gazed device, based on the gazing distance and the measurement distance between each of the at least one gazed device and the remote control device. The implementation of this process can refer to the above disclosure, which will not be described here further.

It is to be noted that, in the embodiment of the present disclosure, the remote control device 10 may verify the user before controlling the device to be controlled, so as to determine whether the user has a right to control the device to be controlled, which will prevent any arbitrary person from controlling the device to be controlled, improving safety of the device to be controlled. It is possible that the remote control device 10 verifies the user, or the device to be controlled verifies the user, or a verifying device dedicated to performing a verifying may be provided to verify the user. Specific reference can be made to the following three embodiments:

According to an embodiment of the present disclosure, the remote control device 10 verifies the user. As shown in FIG. 1-1, the remote control device 10 further comprises a verification information collection assembly 15 provided on the device body 11 and electrically connected to the processing assembly 13. The verification information collecting assembly 15 is configured to collect the user's verification information, and the verification information is configured to verify the control right of the user to the device to be controlled. The processing assembly 13 is configured to verify the user based on the verification information and to allow control to the device to be controlled after verification is successful.

Specifically, the processing assembly 13 may store a correspondence relationship between the verification information and the device identification, which is used to indicate that the device with the corresponding verification information is able to control the device indicated by the corresponding device identification. The processing assembly 13 may look up the correspondence relationship between the verification information stored therein and the device identification according to the verification information collected by the verification information collecting unit 15, obtain a device identification corresponding to the verification information collected by the verification information collecting device 15, and then determine whether the obtained device identification is the same as the identification of the device to be controlled. If the obtained device identification is the same as the identification of the device to be controlled, the processing assembly 13 determines that the verification is successful, and the processing assembly 13 allows control to the device to be controlled. Otherwise, the processing assembly 13 determines that the verification fails and the processing assembly 13 does not allow control to the device to be controlled. It is to be noted that the embodiment of the present disclosure is described by taking the case that the correspondence relationship between the verification information and the device identification comprises the correspondence relationship between the verification information collected by the verification information collecting assembly 15 and the device identification corresponding to the verification information as an example. The processing assembly 13 determines that the verification fails when the correspondence relationship between the verification information and the device identification doesn't comprise the correspondence relationship between the verification information collected by the verification information collecting assembly 15 and the device identification corresponding to the verification information.

According to another embodiment of the disclosure, the device to be controlled verifies the user. As shown in FIG. 1-1, the remote control device 10 further comprises a verification information collection assembly 15 and a communication assembly 16 which are both provided on the device body 11, and the communication assembly 16 is electrically connected to the verification information collection assembly 15 and the processing assembly 13 respectively. The verification information collecting assembly 15 is configured to collect the user's verification information and transmit the verification information to the device to be controlled through the communication assembly 16, such that the device to be controlled verifies the user based on the verification information. The verification information is configured to verify the control right of the user to the device to be controlled. The processing assembly 13 is configured to allow control to the device to be controlled after the device to be controlled has successfully verified the user.

Specifically, the device to be controlled may store verification information. Once the device to be controlled receives verification information sent from the communication assembly 16, the device to be controlled may determine if one of the verification information stored in it is same as the verification information sent from the communication assembly 16. If yes, the device to be controlled determines that the verification to the user is successful and the device to be controlled sends a verification result indicating a successful verification to the communication assembly 16. The processing assembly 13 determines that the verification to the user is successful based on the verification result received by the communication assembly 16, and the processing assembly 13 allows control to the device to be controlled. Otherwise the processing assembly 13 determines that the verification fails and the processing assembly 13 does not allow control to the device to be controlled.

According to another embodiment of the present disclosure, the verifying device verifies the user. As shown in FIG. 1-1, the remote control device 10 further comprises a verification information collection assembly 15 and a communication assembly 16 which are both provided on the device body 11, and the communication assembly 16 is electrically connected to the verification information collection assembly 15 and the processing assembly 13 respectively. The verification information collecting assembly 15 is configured to collect the user's verification information and transmit the verification information to a verifying device through the communication assembly 16, such that the verifying device verifies the user based on the verification information which is configured to verify the control right of the user to the device to be controlled. The processing assembly 13 is configured to allow control to the device to be controlled after the verifying device has successfully verified the user.

Specifically, the verifying device may store a correspondence relationship between the verification information and the device identification, which is used to indicate that the device with the corresponding verification information is able to control the device indicated by the corresponding device identification. The verifying device may look up the correspondence relationship between the verification information stored therein and the device identification according to the verification information sent from the communication assembly 16, obtain a device identification corresponding to the verification information sent from the communication assembly 16, and transmit the device identification corresponding to the verification information sent by the communication assembly 16 to the communication assembly 16. The processing assembly 13 determines if the device identification received by the communication assembly 16 is the same as the identification of the device to be controlled. If the received device identification is the same as the identification of the device to be controlled, the processing assembly 13 determines that the verification is successful, and the processing assembly 13 allows control to the device to be controlled. Otherwise, the processing assembly 13 determines that the verification fails and the processing assembly 13 does not allow control to the device to be controlled. It is to be noted that the embodiment of the present disclosure is described by taking the case as an example that the correspondence relationship between the verification information and the device identification comprises the correspondence relationship between the verification information sent by the communication assembly 16 and the device identification corresponding to the verification information. The processing assembly 13 determines that the verification fails when the correspondence relationship between the verification information and the device identification doesn't comprise the correspondence relationship between the verification information collected by the verification information collecting assembly 15 and the device identification corresponding to the verification information.

Optionally, in the embodiment of the present disclosure, the verification information may be any one of an iris information, a fingerprint information, a palmprint information, and a voice information. The iris information may be an iris image. Correspondingly, the verification information collecting assembly 15 may be any one of an iris recognition camera, a fingerprint recognition sensor, a palmprint recognition sensor, and a voice recognition assembly. When the verification information collecting assembly 15 is an iris recognition camera, the iris recognition camera may be integrated into the eye information collecting assembly 13 to which there is no further description.

Optionally, in an embodiment of the present disclosure, the communication assembly 16 may be a wireless communication assembly or a wired communication assembly, and specifically may be a Bluetooth assembly, a wireless fidelity (WiFi) assembly or a network interface. The remote control device 10 may be provided with a voice recognition assembly, an action recognition assembly, or a gesture recognition assembly. The remote control device 10 may recognize a user's voice control command, an action control command, or a gesture control command, and then control the device to be controlled based on a corresponding control command. Specifically, the communication assembly 16 of the remote control device 10 may send a control command to the device to be controlled and the device to be controlled performs the corresponding action based on the received control command, which will not be described here further.

Further, referring FIG. 1-1, the remote control device 10 further comprises a presentation assembly 17 provided on the device body 11 and electrically connected to the processing assembly 12. The presentation assembly 17 is configured to present information of the device to be controlled. In the embodiment of the present disclosure, the presentation assembly 17 may comprise at least one display assembly, which specifically may be a display screen. Each of the display assembly may display information related to the remote control device 10 and information of the device to be controlled, etc. The information of the device to be controlled may be an identification of the device to be controlled, an image of the device to be controlled and the like. The remote control device 10 provided by the embodiment of the present disclosure may be an Augmented Reality (AR) remote control device. The processing assembly 13 may perform an Augmented Reality process on the image of the device to be controlled, and the display assembly may display an AR image of the device to be controlled, providing the user with a more realistic image of the device to be controlled and enhancing the user's immersive feeling, to which there is no limitation.

It should be noted that the remote control device provided by the embodiment of the present disclosure may further include other components such as a gravity sensor and may be added with new components according to the needs of the actual application scenario, to which there is no limitation.

The remote control device provided by the embodiment of the present disclosure can be applied to electronic door locks, unmanned aerial vehicles, automobile driving, and the like. For example, the user wears the remote control device and reaches the door, observing the electronic door lock installed on the door. The remote control device recognizes the door lock and tries to communicate with the door lock, sending the user verification information to the electronic door lock. The electronic door lock is unlocked after recognizing the user right. For another example, the user wears remote control device to control unmanned aerial vehicles. The remote control device determines the location at which the human eyes observe, which location is planned as a UAV flight target. Further, the user may control unmanned aerial vehicles through voice, action, gestures and the like. For example, the user wears a remote control device to control a car. The remote control device determines the location at which the human eyes observe and the location is planned as a direction of travel of the car. The environment information collecting assembly and the distance collection assembly may collect traffic information in front of the vehicle, vehicle information and feedback them to the processing assembly. The processing assembly optimizes the vehicle traveling direction, speed and so on based on the traffic information in front of vehicle and the vehicle information.

In summary, as the remote control device provided by the present disclosure may determine a device to be controlled based on the user's eye information and the environment information in front of user and control the device to be controlled, the remote control device may control the device to be controlled without the need for users to manually operate the remote control device, which solve a problem that the operation process to control the device to be controlled with a remote control is complicated, simplifying the operation process to control the device to be controlled.

The remote control device provided by the embodiment of the present disclosure may be applied to electronic equipment in internet of things such as a computer, a mobile phone, a home appliance, a switch, a lock, a car, an unmanned aerial vehicle and a wearable equipment which have many advantages such as speed, intelligence and safety.

The remote control device provided by the embodiment of the present disclosure may verify the user using the verifying device. It is not necessary to set a verifying device on each of the device to be controlled, reducing requirements to the device to be controlled, capable of verifying the user in real time and efficiently, and it is not needed to add additional verification unlock action.

Now referring to FIG. 2, which is a schematic structural view of a remote control product according to an embodiment of the present disclosure, the remote control product comprises the remote control device 10 and n devices to be controlled, n being an integer greater than or equal to 1.

The n devices include device 1, device 2, etc. Each of the n devices may be electronic equipment in internet of things such as a computer, a television, a smart refrigerator, a smart socket, a smart air conditioner, a mobile phone, a smart switch, a lock, a terminal onboard, an unmanned aerial vehicle and a wearable equipment, and the n devices may be the same or different.

The remote control device 10 may collect the user's eye information and the environment information of the environment in front of the user, and determine the device to be controlled in the n devices based on the eye information and the environment information. The device to be controlled may be the device 2.

Optionally, as shown in FIG. 2, the remote control product also includes a network device 20 configured to provide a wired network or a wireless network to the remote control device 10 so that the remote control device 10 can control the device to be controlled via the wired network or the wireless network. The network device 20 may be a switch, a router, or the like, to which there is no limitation.

In summary, according to the remote control product provided by the embodiment of the present disclosure, as the remote control device provided by the present disclosure may determine a device to be controlled based on the user's eye information and the environment information of the environment in front of the user and control the device to be controlled, the remote control device may control the device to be controlled without the need for users to manually operate the remote control device, which solve a problem that the operation process to control the device to be controlled with a remote control is complicated, simplifying the operation process to control the device to be controlled.

Figures 1, 3:
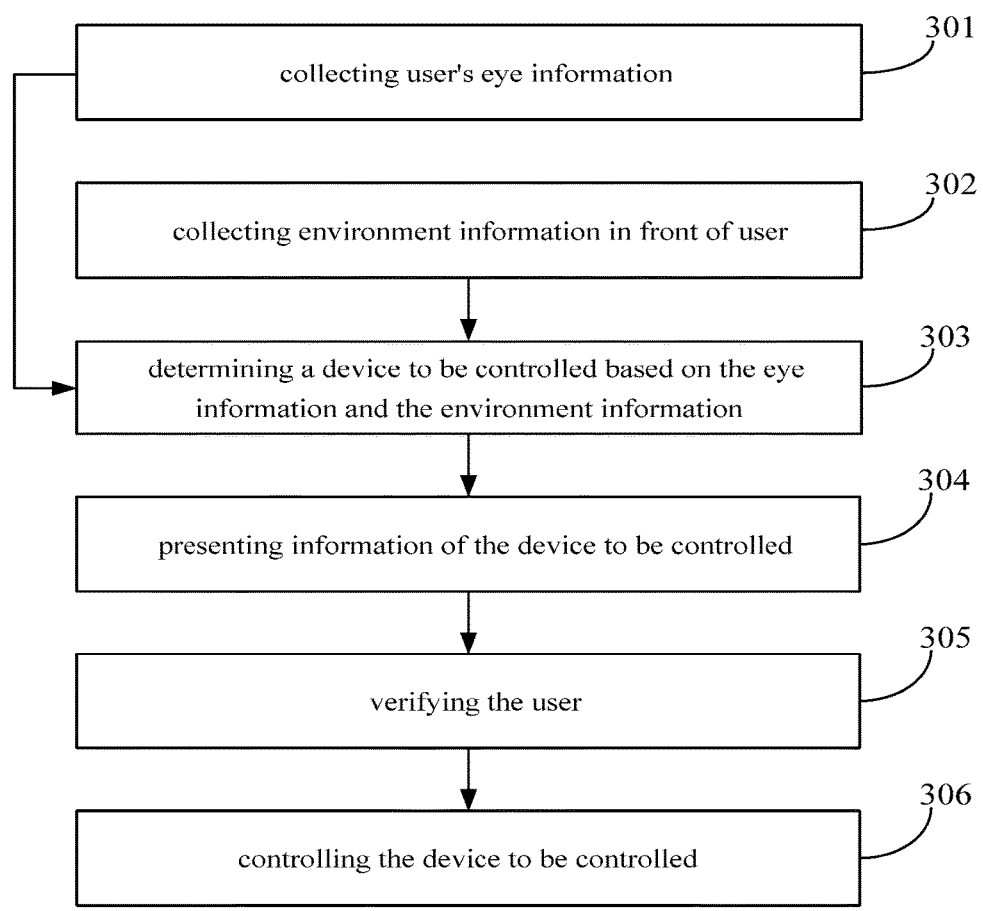
Figures 2, 3:
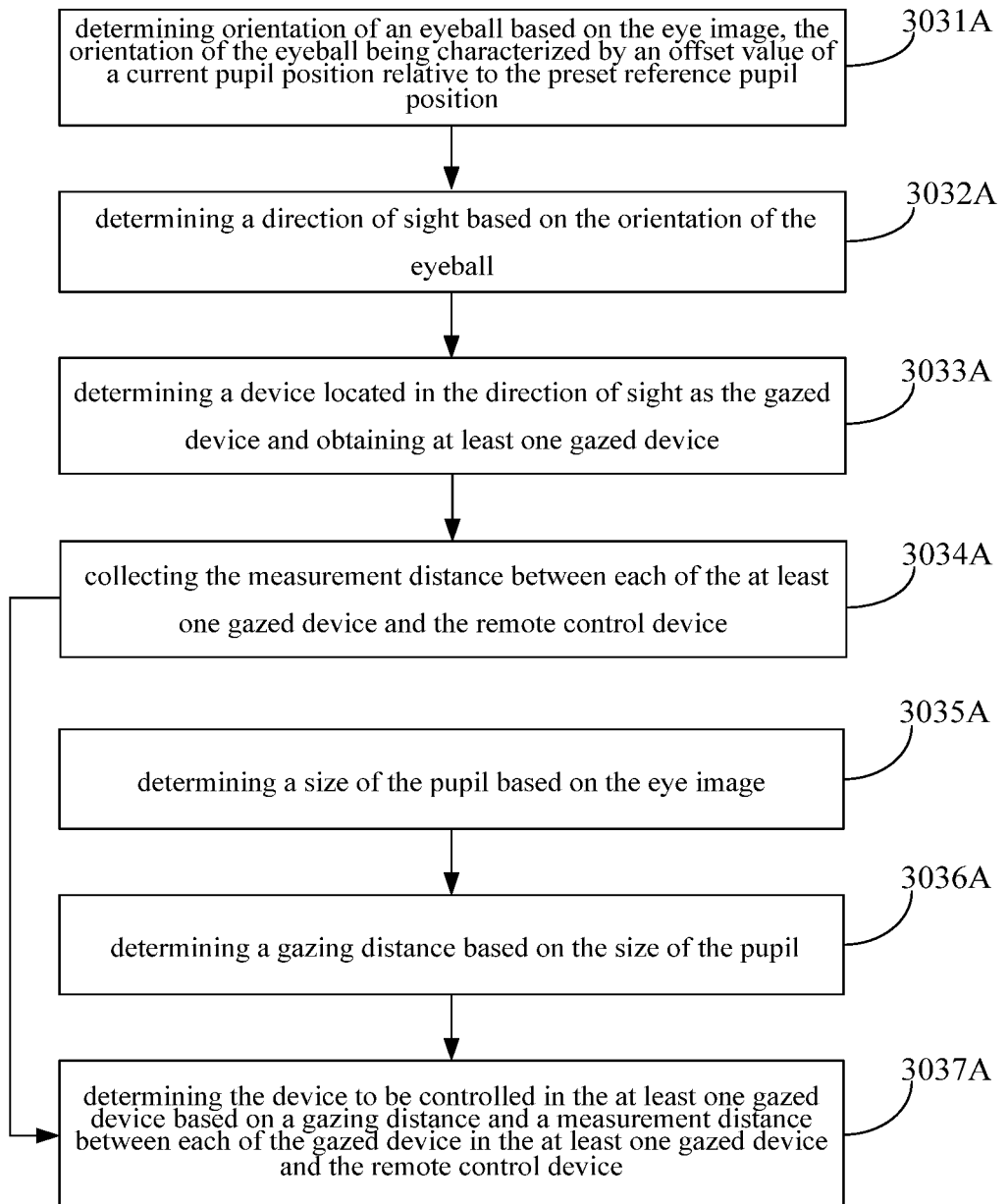
Figure 3:
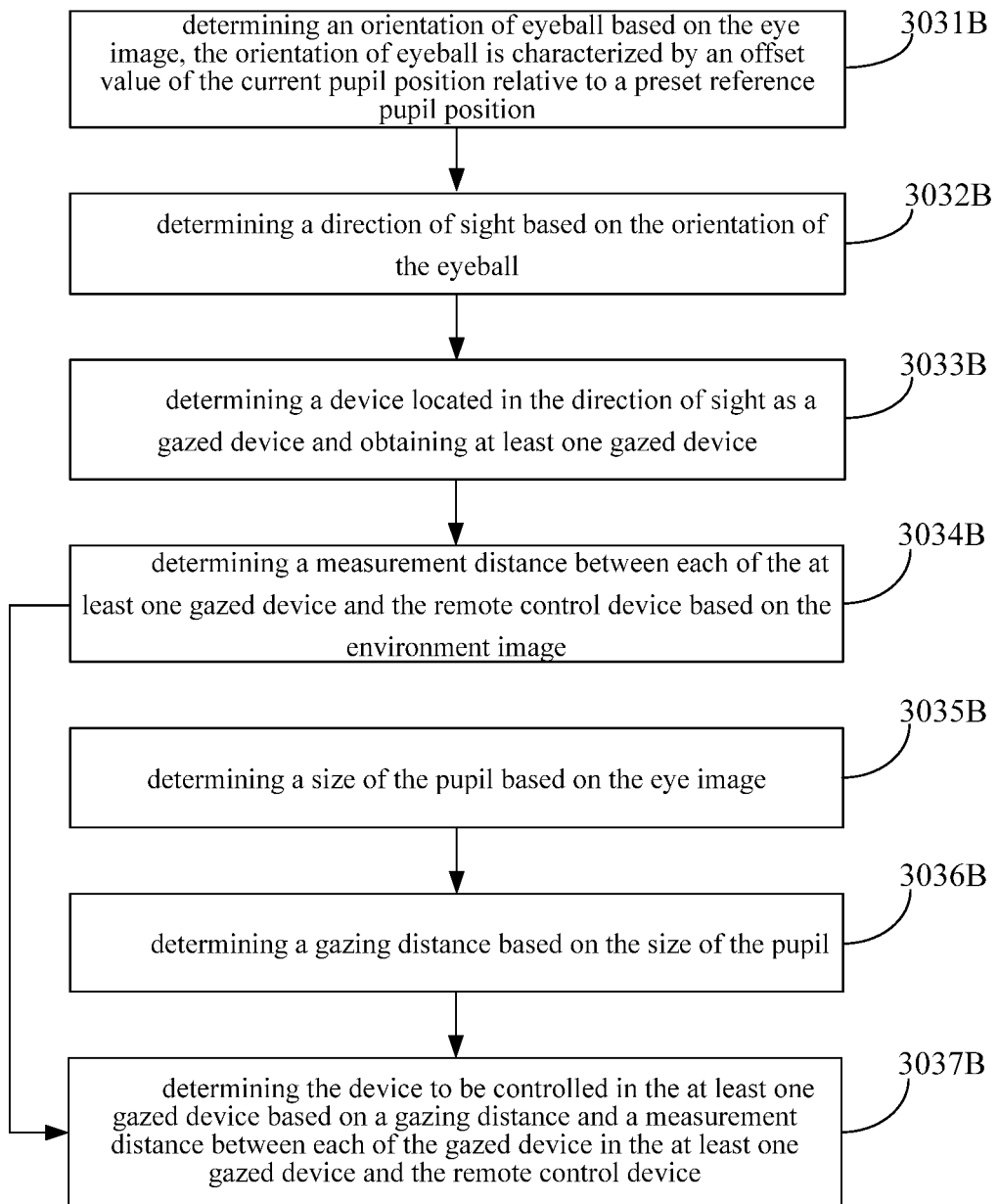

Referring FIG. 3-1, which shows a flow chart of a remote control method according to an embodiment of the present disclosure and the remote control method is used for the remote control device 10 shown in FIG. 1-1, the remote control method comprises:

Step 301, collecting user's eye information;

The remote control device is provided with an eye information collecting assembly, and the remote control device may collect the user's eye information through the eye information collecting assembly. By way of example, the eye information collecting assembly may be an eye image collecting assembly, and specifically may be a camera. The remote control device may collect the user's eye image by shooting of the camera.

In the embodiment of the present disclosure, the remote control device includes a device body, and the device body is a wearable structure capable of being worn on a user's head such as an eyeglass, a helmet. The eye information collecting assembly is provided inside the device body and is directed towards the user's eye when it is worn by user, so as to facilitate the collection of the eye information of the user.

Step 302: collecting environment information in front of user;

The remote control device is equipped with an environment information collecting assembly, and the remote control device may collect the environment information of the environment in front of the user through the environment information collecting assembly. For example, the environment information collecting assembly may be a distance collecting assembly or an environment image collecting assembly, and correspondently, the environment information may be the environment image or the distance between the device in the environment and the remote control device. The distance collecting assembly may be an infrared ray distance measuring sensor, a microwave distance measuring sensor, an ultrasonic distance measuring sensor, or a laser distance measuring sensor and the like. The environment image collecting assembly may be a camera, to which there is no limitation.

In the embodiment of the present disclosure, the environment information collecting assembly is provided outside the device body, and when the device body is worn by the user, the environment information collecting assembly faces the environment in front of the user so as to facilitate the collection of environment information of the environment in front of the user.

Step 303: determining a device to be controlled based on the eye information and the environment information.

The remote control device may determine the device to be controlled based on the eye information and environment information after it has collected eye information and environment information. The remote control device comprises a processing assembly, and the eye information collecting assembly and the environment information collecting assembly are respectively electrically connected with the processing assembly. The device to be controlled may be determined by the processing assembly based on the eye information and the environment information.

In the embodiment of the present disclosure, the eye information is an eye image, and the environment information is a measurement distance between each of the at least one gazed devices and the remote control device; or the eye information is an eye image, the environment information being an environment image. The environment image includes the image of the at least one gazed device. The process of determining the device to be controlled according to the embodiment of the present disclosure will be described below with reference to FIGS. 3-2 and 3-3.

For example, referring to FIG. 3-2, which shows a flow chart of a method for determining a device to be controlled in the remote control method provided by the embodiment shown in FIG. 3-1, in which the case that the environment information is the measurement distance between each of the at least one gazed devices and the remote control device is taken as an example. Referring to FIG. 3-2, the method comprises:

Sub-step 3031A, determining an orientation of an eyeball based on the eye image, the orientation of the eyeball being characterized by an offset value of a current pupil position relative to the preset reference pupil position. The reference pupil position may be the position where the pupil is located at the center of eye, or may be the position where the pupil is located at any other position of the eye. The reference pupil position may be different for different users, and the remote control device may determine the reference pupil position by machine learning, or determine the reference pupil position according to a human eye standard template, without limiting thereto in the present disclosure.

In an embodiment of the present disclosure, the eye image includes an image of the left eye and an image of the right eye. The remote control device may respectively determine the orientation of the left eyeball and the orientation of the right eyeball, based on the eye image. By way of example, as shown in FIG. 1-2, the orientation of the right eyeball can be characterized by an offset value of the current pupil position K1 of the right eye relative to the preset reference pupil position K of the right eye. The offset value of the current pupil position K1 of the right eye relative to the preset reference pupil position K of the right eye may include an offset value x1 on the x-axis and an offset value y1 on the y-axis, and similarly, the offset value of the current pupil position K2 of the left eye relative to the preset reference pupil position K of the left eye may include an offset value x2 on the x-axis and an offset value y2 on the y-axis.

Sub-step 3032A: determining a direction of sight based on the orientation of the eyeball.

The remote control device may determine a direction of sight based on the orientation of the eyeball after it has determined the orientation of the eyeball. Specifically, the remote control device may determine the direction of sight based on the orientations of the left and right eyeballs together. As shown in FIG. 1-2, the remote control device may determine the direction of sight s based on the orientations of the left and right eyeballs together.

Sub-step 3033A: determining a device located in the direction of sight as the gazed device and obtaining the at least one gazed device.

The remote control device may determine the device located in the direction of sight as the gazed device after it has determined the direction of sight. As shown in FIG. 1-2, the device located in the direction of sight s is the device 2, and then the remote control device deems that the device 2 is the gazed device. It should be noted that FIG. 1-2 is described taking the case in which there is one device located in the direction of sight s as an example. In practice, there may be a plurality of devices located the direction of sight s, so that the processing assembly may determine at least one gazed device, which will not be described here.

Sub-step 3034A: collecting the measurement distance between each of the at least one gazed device and the remote control device.

The remote control device is provided with a distance collecting assembly configured to collect a measurement distance between each of the at least one gazed device and the remote control device.

By way of example, the distance collecting assembly is an infrared ray distance measuring sensor, and the gazed device is the device 2 in FIG. 1-2. The infrared ray distance measuring sensor may include an infrared ray emitting tube and an infrared ray receiving tube. The infrared ray emitting tube is configured to emit an infrared light to the device 2. When the infrared light is irradiated onto the device 2, the device 2 reflects the infrared light. The reflected infrared light reaches the infrared ray receiving tube and is received by the infrared ray receiving tube. The propagation time period of the infrared light is calculated based on the time at which the infrared light is emitted and the time at which the infrared light is received and the measurement distance between the infrared distance measuring sensor and the device 2 is calculated by combining the speed of light. Then the measurement distance between the infrared ray distance measuring sensor and the device 2 is used as the measurement distance between the remote control device 10 and the device 2.

Sub-step 3035A: determining a size of the pupil based on the eye image.

In an embodiment of the present disclosure, the eye image includes a pupil image. The remote control device may determine the ratio of size of the pupil image to the eye image based on the eye image, and then obtain the focal length used when the eye image is collected, and then calculate the actual size of the eye based on the focal length, and then calculate the actual size of the pupil, that is, the pupil size, based on the actual size of the eye and the ratio of size of the pupil image to the eye image, to which there is no limitation in the present disclosure.

Sub-step 3036A: determining a gazing distance based on the size of the pupil.

The size of the pupil is different when the human eye is gazing different distances. The remote control device may store a correspondence relationship between the pupil size and the gazing distance, which is used to indicate the pupil size when it is gazing a corresponding distance. The remote control device may look up the correspondence relationship between the pupil size and the gazing distance to obtain a distance corresponding to the pupil size and use the distance corresponding to the pupil size as the corresponding gazing distance. In the embodiment of the present disclosure, the correspondence relationship between the pupil size and the gazing distance may be configured to the remote control device before it is laid off, or may be determined by the remote control device through a machine learning method, to which there is no limitation in the present disclosure.

Sub-step 3037A: determining the device to be controlled in the at least one gazed device based on a gazing distance and a measurement distance between each of the gazed device in the at least one gazed device and the remote control device.

The remote control device determines the device to be controlled in the at least one gazed device, based on the gazing distance and the measurement distance between each of the at least one gazed device and the remote control device, after it determines the gazing distance and the measurement distance between each of the at least one gazed device and the remote control device. Optionally, the remote control device may determine a gazed device in the at least one gazed device for which the measurement distance is closest to the gazing distance as the device to be controlled.

By way of example, it is assumed that at least one gazed device includes a device 1, a device 2 and a device 3, and that the measurement distance between the device 1 and the remote control device is a, the measurement distance between the device 2 and the remote control device is b, and the measurement distance between the device 3 and the remote control device is c. It is further assumed that the gazing distance is b1, and b is closest to b1. Then the remote control device determines the device 2 as a device to be controlled.

For example, referring to FIG. 3-3, which shows a flow chart of another method for determining a device to be controlled in the remote control method provided by the embodiment shown in FIG. 3-1, in which the case that the environment information is an environment image is taken as an example. Referring to FIG. 3-3, the method comprises:

Sub-step 3031B: determining an orientation of eyeball based on the eye image, the orientation of eyeball is characterized by an offset value of the current pupil position relative to a preset reference pupil position.

Sub-step 3032B: determining a direction of sight based on the orientation of the eyeball.

Sub-step 3033B: determining a device located in the direction of sight as a gazed device and obtaining the at least one gazed device.

The implement process of the sub-steps 3031B-3033B may refer to the implement process of the sub-steps 3031A-3033A in the embodiment shown in FIG. 3-2, which will not be repeated here.

Sub-step 3034B: determining a measurement distance between each of the at least one gazed device and the remote control device based on the environment image.

The environment image includes an image of at least one gazed device. The remote control device may determine a measurement distance between each of the at least one gazed device and the remote control device based on the environment image. Optionally, the remote control device may determine the ratio of size of the image of each of the at least one gazed device and the environment image according to the environment image, and then obtains the focal length used by the camera when capturing the environment image, and further, based on the focal length and the ratio of size of the image of each of the at least one gazed device and the environment image, calculates the measurement distance between each of the gazed devices and the camera, and determines the measurement distance between each of the gazed devices and the camera as the measurement distance between each of the gazed devices and the remote control device, to which there is no limitation in the present disclosure.

Sub-step 3035B: determining a size of the pupil based on the eye image,

Sub-step 3036B: determining a gazing distance based on the size of the pupil,

Sub-step 3037B: determining the device to be controlled in the at least one gazed device based on a gazing distance and a measurement distance between each of the gazed device in the at least one gazed device and the remote control device.

The implement process of the sub-steps 3035B-3037B may refer to the implement process of the sub-steps 3035A-3037A in the embodiment shown in FIG. 3-2, which will not be repeated here.

Step 304: presenting information of the device to be controlled.

The remote control device further comprises a presentation assembly. The remote control device presents information of the device to be controlled through the presentation assembly. In the embodiment of the present disclosure, the presentation assembly may be a display assembly, which specifically may be a display screen. The information of the device to be controlled may be an identification of the device to be controlled or an image of the device to be controlled and the like.

It is to be noted that the remote control device provided by the embodiment of the present disclosure may be an Augmented Reality (AR) remote control device which may perform a AR processing on the image of the device to be controlled, and the display assembly may display an AR image of the device to be controlled, providing the user with a more realistic image of the device to be controlled and enhancing the user's immersive feeling, to which there is no limitation.

Step 305: verifying the user.

The remote control device may verify the user before controlling the device to be controlled, so as to determine whether the user has a right to control the device to be controlled, which will prevent any arbitrary person from controlling the device to be controlled, improving safety of the device to be controlled. It is possible that the remote control device verifies the user, or the device to be controlled verifies the user, or a verifying device dedicated to performing a verifying may be provided to verify the user. Specific reference can be made to the embodiment shown in FIG. 3-4 to FIG. 3-6.

Figures 3, 4:
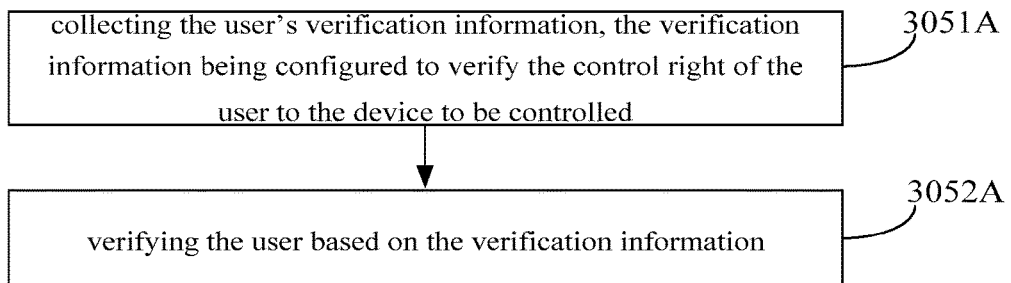

For example, referring to FIG. 3-4, which shows a flow chart of a method for verifying a user in the remote control method provided by the embodiment shown in FIG. 3-1 and in which the case that the remote control device verifies the user is taken for example, the method comprises:

Sub-step 3051A, collecting the user's verification information, the verification information being configured to verify the control right of the user to the device to be controlled.

The remote control device is provided with a verification information collecting assembly and may collect the verification information of user with the verification information collecting assembly. The verification information verifies a control right of the user to the device to be controlled. The verification information may be any one of an iris information, a fingerprint information, a palmprint information, and a voice information. Correspondingly, the verification information collecting assembly may be any one of an iris recognition camera, a fingerprint recognition sensor, a palmprint recognition sensor, and a voice recognition assembly.

Sub-step 3052A, verifying the user based on the verification information

The remote control device may verify the user based on the verification information, after it has collected the user's verification information. Specifically, the remote control device may store a correspondence relationship between the verification information and the device identification, which is used to indicate that a device with the corresponding verification information is able to control a device indicated by the corresponding device identification. The remote control device may look up the correspondence relationship between the verification information stored therein and the device identification according to the collected verification information, obtain a device identification corresponding to the verification information collected by the verification information collecting device, and then determine whether the obtained device identification is the same as the identification of the device to be controlled. If the device identification is the same as the identification of the device to be controlled, the processing assembly 13 determines that the verification is successful. Otherwise, the processing assembly 13 determines that the verification fails.

Figures 3, 4, 5:
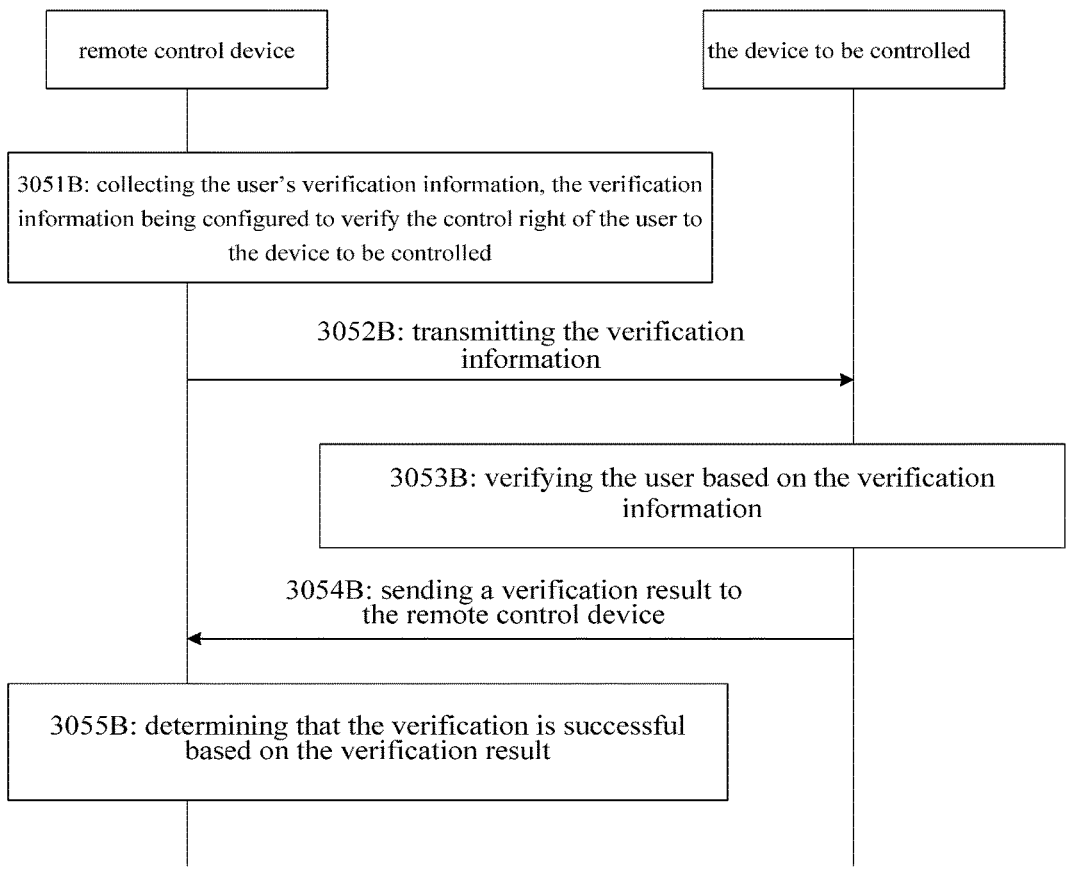
Figures 3, 4, 5, 6:
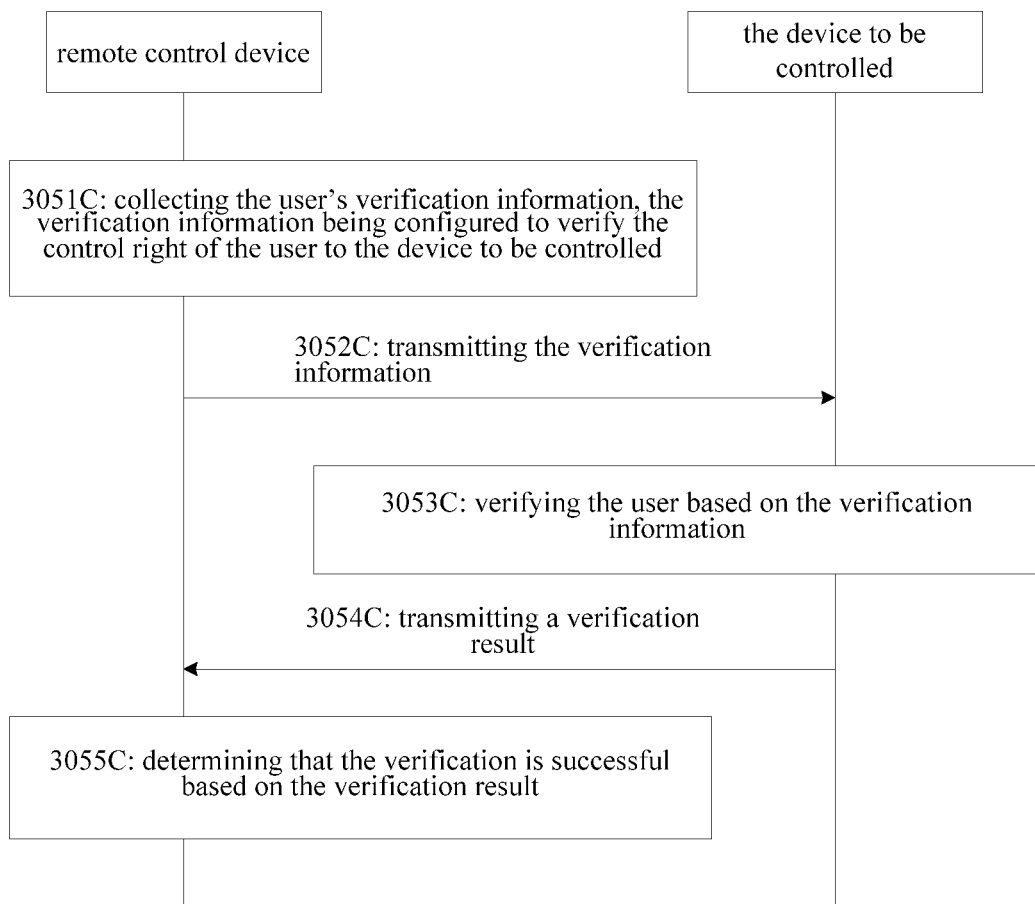
Figures 1, 4:
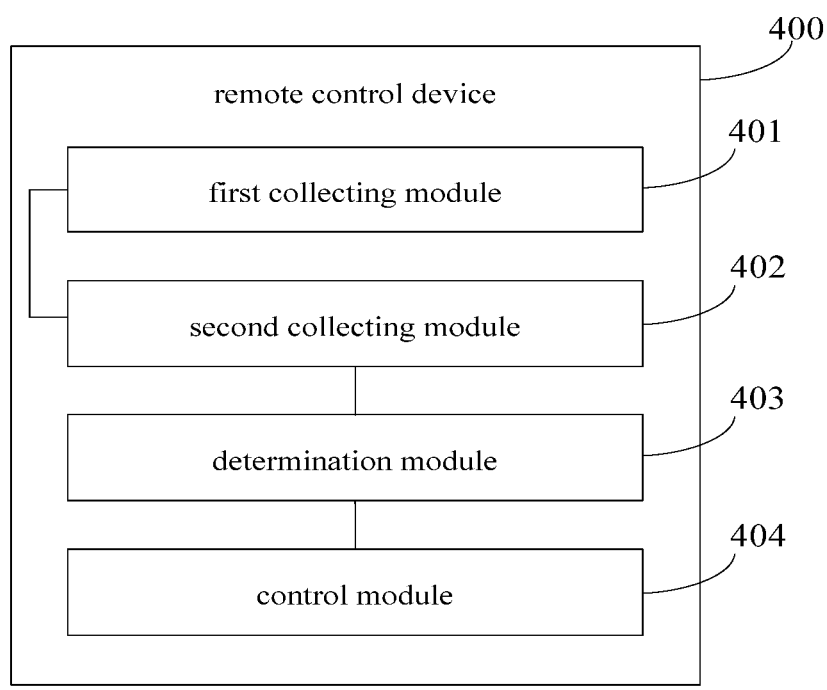
Figures 2, 4:
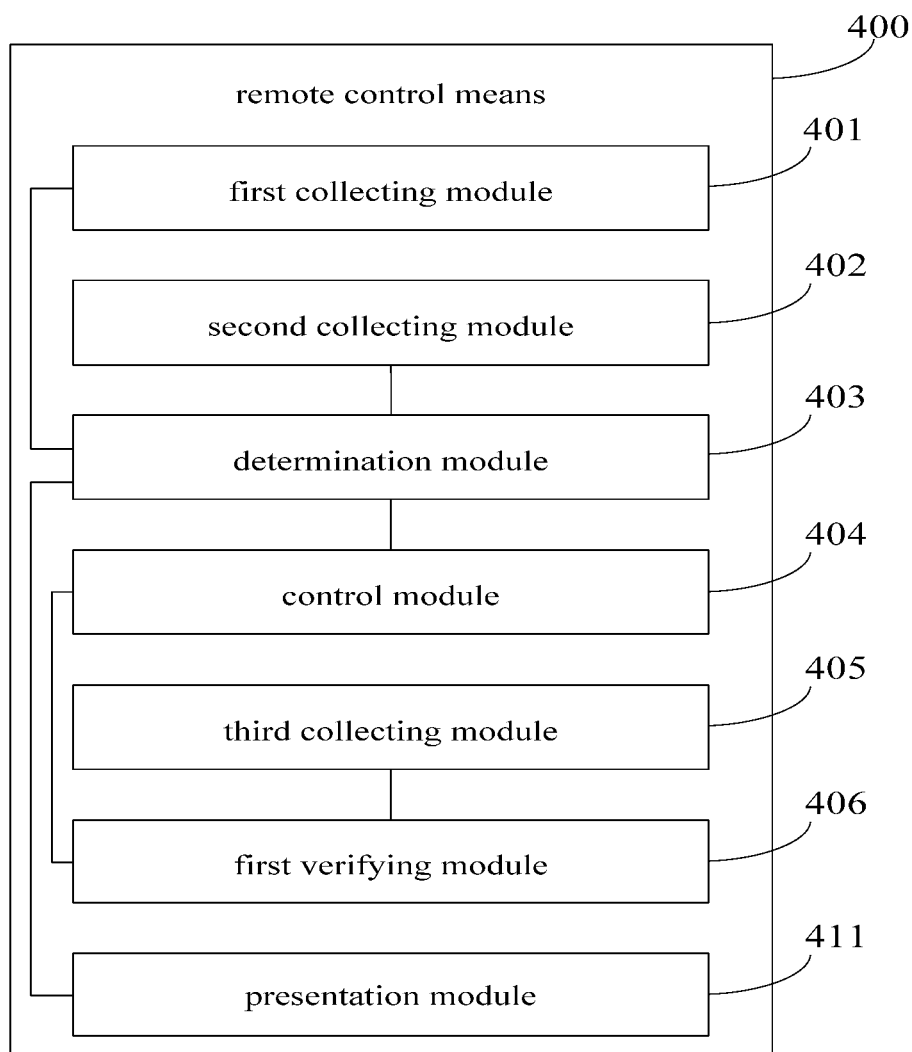
Figures 3, 4:
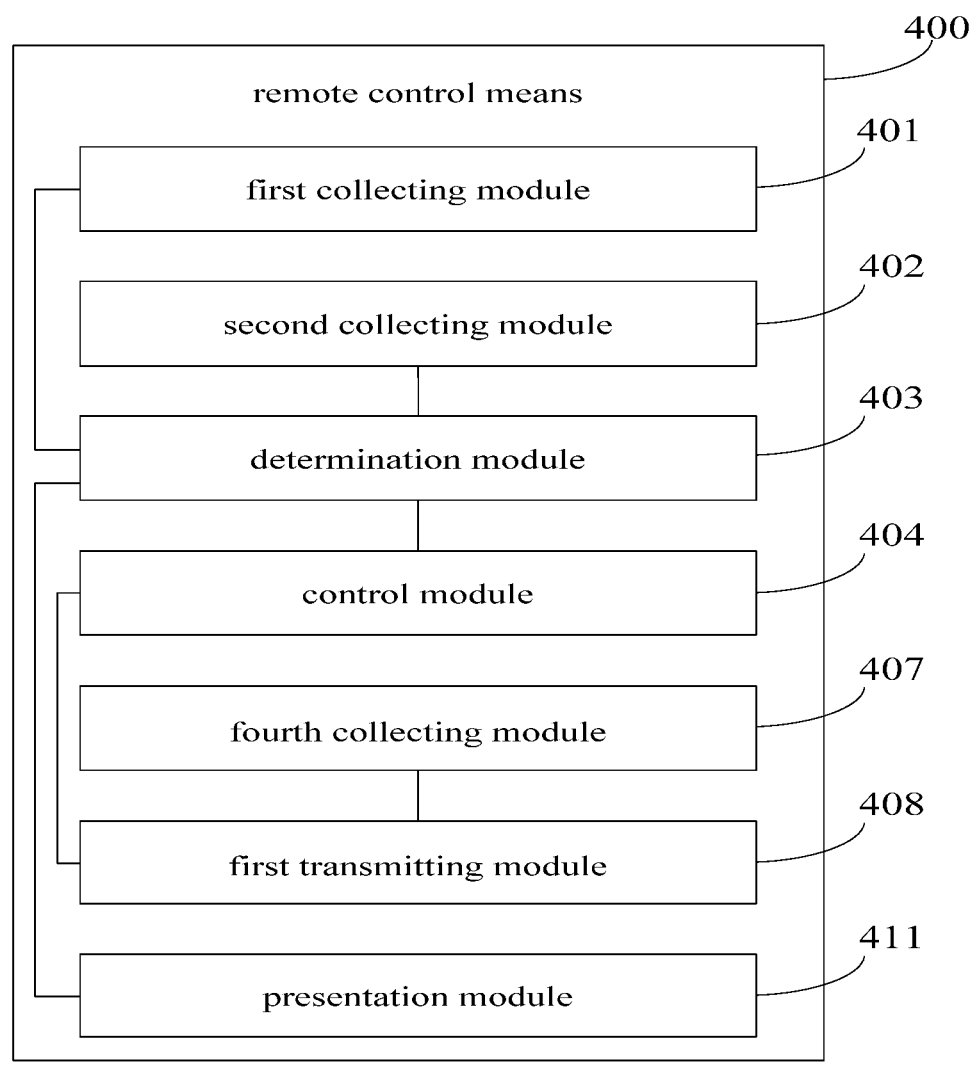
Figure 4:
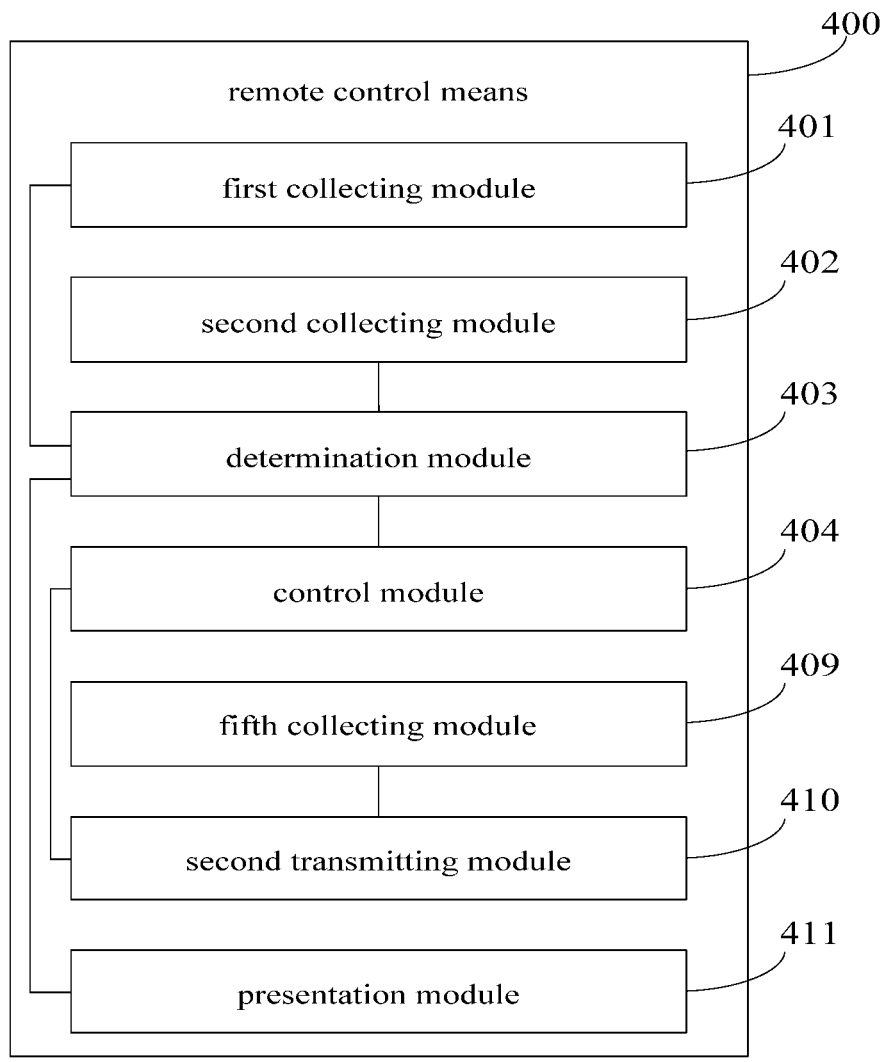

For example, referring to FIG. 3-5, which shows a flow chart of another method for verifying user in the remote control method provided by the embodiment shown in FIG. 3-1 and in which the case that the device to be controlled verifies the user is taken for example, the method comprises:

Sub-step 3051B, the remote control device collecting the user's verification information, the verification information being configured to verify the control right of the user to the device to be controlled.

The sub-step 3051B may refer to sub-step 3051A in the embodiment shown in FIG. 3-4, which will not be described again here.

Sub-step 3052B: the remote control device transmitting the verification information to the device to be controlled.

The remote control device may send the verification information to the device to be controlled after it has collected the verification information of the user. The remote control device is provided with a communication assembly, and the remote control device may transmit the verification information to the device to be controlled through the communication device.

Sub-step 3053B: the device to be controlled verifying user based on the verification information.

The device to be controlled may receive the verification information sent by the remote control device and verify the user based on the verification information when the remote control device sends the verification information to the device to be controlled.

Specifically, the device to be controlled may store verification information. Once the device to be controlled receives a verification information sent from the remote control device, the device to be controlled may determine if one of the verification information stored in it is same as the verification information sent from the remote control device. If yes, the device to be controlled determines that the verification to the user is successful. Otherwise the device to be controlled determines that the verification fails.

Sub-step 3054B: the device to be controlled sending a verification result to the remote control device.

The device to be controlled sends the verification result to the remote control device after the device to be controlled verifies user. The verification result may indicate that the verification is successful or the verification fails. The embodiment of the invention will be described taken the case that the verification is successful as an example. In particular, the device to be controlled may send a verification result to the communication assembly of the remote control device, to which there is no limitation in the present disclosure.

Sub-step 3055B: the remote control device determining that the verification is successful based on the verification result.

When the device to be controlled sends the verification result to the remote control device, the remote control device may receive the verification result. Since the embodiment of the present disclosure is described taken the case that the verification result indicates that the verification is successful, the remote control device determines that the verification is successful based on the verification result.

For example, referring to FIG. 3-6, which shows a flow chart of another method for verifying user in the remote control method provided by the embodiment shown in FIG. 3-1 and in which the case that the verifying device verifies the user is taken for example, the method comprises:

Sub-step 3051C, the remote control device collecting the user's verification information, the verification information being configured to verify the control right of the user to the device to be controlled.

The sub-step 3051C may refer to sub-step 3051A in the embodiment shown in FIG. 3-4, which will not be described again here.

Sub-step 3052C: the remote control device transmitting the verification information to a verifying device.

The remote control device may send the verification information to the verifying device after it has collected the verification information of user. The remote control device is provided with a communication assembly, and the remote control device may transmit the verification information to the verifying device through the communication device. The verification device can be smart terminals such as mobile phones and computers.

Sub-step 3053C: the verifying device verifying user based on the verification information.

The verifying device may receive the verification information sent by the remote control device and verify the user based on the verification information when the remote control device sends the verification information to the verifying device.

Specifically, the verifying device may store a correspondence relationship between the verification information and the device identification, which is used to indicate that a device with the corresponding verification information is able to control a device indicated by the corresponding device identification. The verifying device may look up the correspondence relationship between the verification information stored therein and the device identification according to the verification information sent from the remote control device, obtain a device identification corresponding to the verification information sent from the remote control device, such a process may be named as a verification process.

Sub-step 3054C: the verifying device transmitting a verification result to the remote control device.

The verifying device may send the verification result to the remote control device. The verification result may include the device identification obtained by looking up the verifying device. Specifically, the verifying device sends the verification result to communication assembly of the remote control device, to which there is no limitation in the present disclosure.

Sub-step 3055C: the remote control device determining that the verification is successful based on the verification result.

When the verifying device sends the verification result to the remote control device, the remote control device may receive the verification result and then may determine if the verification is successful based on the verification result. Specifically, the remote control device determines if the device identification in the verification result is the same as the identification of the device to be controlled. If the device identification in the verification result is the same as the identification of the device to be controlled, the remote control device determines that the verification is successful. Otherwise, the remote control device determines that the verification fails.

Step 306: controlling the device to be controlled.

The remote control device may control the device to be controlled after the verification is successful. Specifically, the remote control device allows the user to control the device to be controlled after the verification is successful In an embodiment of the present disclosure, the remote control device may be provided with a voice recognition assembly, an action recognition assembly, or a gesture recognition assembly. The remote control device may recognize a user's voice control command, an action control command, or a gesture control command, and then control the device to be controlled based on a corresponding control command, which will not be described here further.

It should be noted that the sequence of the steps of the remote control method provided by the embodiment of the present disclosure can be appropriately adjusted, and the steps may be added or reduced accordingly. Any modified method appreciated by a person skilled in the art will be intended to be within the scope of the present disclosure and will not be described again.

In summary, according to the remote control method provided by the embodiment of the present disclosure, as the remote control device provided by the present disclosure may determine a device to be controlled based on the user's eye information and the environment information of the environment in front of the user and control the device to be controlled, the remote control device may control the device to be controlled without the need for users to manually operate the remote control device, which solve a problem that the operation process to control the device to be controlled with a remote control is complicated, simplifying the operation process to control the device to be controlled.

The following apparatus embodiments of the present disclosure may be used to implement the method embodiments of the present disclosure. For the details that are not disclosed in the embodiments of the present disclosure, reference is made to the method embodiments of the present disclosure.

Referring to FIG. 4-1, which shows a block diagram of a remote control means 400 according to an embodiment of the present disclosure, in which the remote control means 400 may be implemented into the remote control device 10 in FIG. 1-1 partially or as a whole, by a software or a hardware, or both of them, the remote control means 400 may include, but is not limited to, a first collecting module 401 for collecting a user's eye information;

a second collecting module 402 for collecting environment information of the environment in front of the user;

a determination module 403 for determining a device to be controlled based on the eye information and the environment information; and a control module 404 for controlling the device to be controlled.

In summary, according to the remote control means provided by the embodiment of the present disclosure, as the remote control device provided by the present disclosure may determine a device to be controlled based on the user's eye information and the environment information of the environment in front of the user and control the device to be controlled, the remote control device may control the device to be controlled without the need for users to manually operate the remote control device, which solves a problem that the operation process to control the device to be controlled with a remote control is complicated, simplifying the operation process to control the device to be controlled.

Optionally, the eye information is an eye image and the environment information is a measurement distance between each of the at least one gazed device and the remote control device. The determining module 403 is configured to:

determine orientation of an eyeball based on the eye image, the orientation of the eyeball being characterized by an offset value of a current pupil position relative to a preset reference pupil position;

determine a direction of sight based on the orientation of the eyeball;

determine a device located in the direction of sight as a gazed device and obtain the at least one gazed device;

determine a size of the pupil based on the eye image;

determine a gazing distance based on the size of the pupil; and determine the device to be controlled in the at least one gazed device, based on the gazing distance and the measurement distance between each of the at least one gazed device and the remote control device.

Optionally, the eye information is an eye image and the environment information is an environment image including an image of at least one gazed device. The determining module 403 is configured to:

determine orientation of an eyeball based on the eye image, the orientation of the eyeball being characterized by an offset value of a current pupil position relative to a preset reference pupil position;

determine a direction of sight based on the orientation of the eyeball;

determine a device located in the direction of sight as a gazed device and obtain at least one gazed device;

determine a size of the pupil based on the eye image;

determine a gazing distance based on the size of the pupil;

determine a measurement distance between each of the at least one gazed device and the remote control device based on the environment image; and determine the device to be controlled in the at least one gazed device, based on the gazing distance and the measurement distance between each of the at least one gazed device and the remote control device.

Optionally, the determining module 403 is configured to select one of the at least one gazed device whose measure distance is closest to the gazing distance as the device to be controlled.

Optionally, referring FIG. 4-2, which is a block diagram of another remote control means 400 according to an embodiment of the present disclosure, on bases of FIG. 4-1, the remote control means 400 further comprises:

a third collecting module 405 configured to collect the user's verification information, the verification information being configured to verify the control right of the user to the device to be controlled; and a first verifying module 406 configured to verify the user based on the verification information.

The control module 404 is configured to allow control to the device to be controlled after the verification is successful.

Optionally, referring FIG. 4-3, which is a block diagram of another remote control means 400 according to an embodiment of the present disclosure, on basis of FIG. 4-1, the remote control means 400 further comprises:

a fourth collecting module 407 configured to collect the user's verification information, and the verification information is configured to verify the control right of the user to the device to be controlled; and a first transmitting module 408 configured to transmit the verification information to the device to be controlled, so as to cause the device to be controlled to verify the user based on the verification information;

wherein the control module 404 is further configured to control the device to be controlled after the verification of the device to be controlled to the user is successful.

Optionally, referring FIG. 4-4, which shows a block diagram of yet another remote control means 400 according to an embodiment of the present disclosure, on basis of FIG. 4-1, the remote control means 400 further comprises:

a fifth collecting module 409 configured to collect the user's verification information, and the verification information is configured to verify the control right of the user to the device to be controlled; and a second transmitting module 410 configured to transmit the verification information to a verifying device so that the verifying device verifies the user according to the verification information;

wherein the control module 404 is further configured to control the device to be controlled after the verification of the verifying device to the user is successful.

As shown in any one of FIGS. 4-2 to 4-4, the remote control means 400 further comprises: a presentation module 411 configured to present information of the device to be controlled.

In summary, according to the remote control means provided by the embodiment of the present disclosure, as the remote control device provided by the present disclosure may determine a device to be controlled based on the user's eye information and the environment information of the environment in front of the user and control the device to be controlled, the remote control device may control the device to be controlled without the need for users to manually operate the remote control device, which solves a problem that the operation process to control the device to be controlled with a remote control is complicated, simplifying the operation process to control the device to be controlled.

It should be noted that, the remote control means provided by the above-described embodiment is described by taking each of the above-described functional modules as an example, when the remote control means controls the device to be controlled. In practice, the above-described functions may be achieved by different functional modules as necessary. That is, the internal structure of the device is divided into different functional modules to achieve the functions described above partially or as a whole. In addition, the remote control device, the remote control method, and the remote control means provided in the above embodiments belong to one same concept, and the implementation process thereof can be referred to each other, which will not be repeated here.

It will be understood by those skilled in the art that all or part of the steps to implement the embodiments described above may be achieved by hardware, or by instructing the associated hardware to achieve them through programs, which may be stored in a computer readable storage medium. The mentioned storage medium may be read-only memory, a magnetic disk, or an optical disk.

The foregoing description is intended only as optional embodiment of the present disclosure and is not intended to limit the present disclosure. Any modifications, equivalent substitutions, improvements, and the like within the spirit and principles of the present disclosure are included within the scope of the present disclosure.

What is claimed is:

1. A remote control device comprising: a device body, a processing assembly, an eye information collecting assembly and an environment information collecting assembly,
    wherein the processing assembly, the eye information collecting assembly and the environment information collecting assembly are arranged on the device body, and the eye information collecting assembly and the environment information collecting assembly are electrically connected to the processing assembly respectively,
    wherein the eye information collecting assembly is configured to collect a user's eye information; and the environment information collecting assembly is configured to collect environment information of an environment in front of the user;
    wherein the processing assembly is configured to determine a device to be controlled based on the eye information and the environment information, and to control the device to be controlled,
    wherein the eye information collecting assembly is an eye image collecting assembly, the eye information being an eye image,
    wherein the processing assembly is configured to determine an orientation of an eyeball based on the eye image, determine a direction of sight based on the orientation of the eyeball, and determine a device located in the direction of sight as a gazed device and obtain at least one gazed device, and wherein the orientation of the eyeball is characterized by an offset value of a current pupil position relative to a preset reference pupil position,
    wherein the processing assembly is further configured to determine a size of a pupil based on the eye image and to determine a gazing distance based on the size of the pupil, and
    wherein the processing assembly is further configured to determine the device to be controlled in the at least one gazed device, based on the gazing distance and a measurement distance between each of the at least one gazed device and the remote control device.

2. The remote control device according to claim 1, wherein:
    the device body is a wearable structure, the eye information collecting assembly is provided inside the device body, the environment information collecting assembly is provided outside the device body, and the eye information collecting assembly faces the user's eye and the environment information collecting assembly faces the environment in front of the user, when the device body is worn by the user.

3. The remote control device according to claim 1, wherein:
    the environment information collecting assembly is a distance collecting assembly; and
    the distance collecting assembly is configured to collect the measurement distance between each of the at least one gazed device and the remote control device.

4. The remote control device according to claim 1, wherein:
    the environment information collecting assembly comprises an environment image collecting assembly;
    the environment image collecting assembly is configured to collect an environment image of the environment in front of the user, which includes an image of the at least one gazed device; and
    the processing assembly is further configured to determine a measurement distance between each of the at least one gazed device and the remote control device based on the environment image.

5. The remote control device according to claim 3, wherein:
    the processing assembly is further configured to select one of the at least one gazed device whose measurement distance is closest to the gazing distance as the device to be controlled.

6. The remote control device according to claim 1, wherein:
    the remote control device further comprises a verification information collection assembly provided on the device body and electrically connected to the processing assembly;

the verification information collecting assembly is configured to collect the user's verification information, and the verification information is configured to verify a control right of the user to the device to be controlled; and the processing assembly is configured to verify the user based on the verification information and to allow control of the device to be controlled after the verification is successful.

7. The remote control device according to claim 1, wherein:
the remote control device further comprises a verification information collection assembly and a communication assembly which are both provided on the device body, and the communication assembly is electrically connected to the verification information collection assembly and the processing assembly respectively;
the verification information collecting assembly is configured to collect the user's verification information and transmit the verification information to the device to be controlled through the communication assembly, such that the device to be controlled verifies the user based on the verification information, the verification information being configured to verify a control right of the user to the device to be controlled; and
the processing assembly is configured to allow control of the device to be controlled after the device to be controlled has successfully verified the user.

8. The remote control device according to claim 1, wherein:
the remote control device further comprises a verification information collection assembly and a communication assembly which are both provided on the device body, and the communication assembly is electrically connected to the verification information collection assembly and the processing assembly respectively;
the verification information collecting assembly is configured to collect the user's verification information and transmit the verification information to a verifying device through the communication assembly, such that the verifying device verifies the user based on the verification information, the verification information being configured to verify a control right of the user to the device to be controlled; and
the processing assembly is configured to allow control of the device to be controlled after the verifying device has successfully verified the user.

9. The remote control device according to claim 1, wherein:
the remote control device further comprises a presentation assembly provided on the device body and electrically connected to the processing assembly; and
the presentation assembly is configured to present information of the device to be controlled.

10. A remote control product, comprising
a device to be controlled and the remote control device according to claim 1.

11. A remote control method for operating the remote control device according to claim 1, comprising steps of:
collecting the user's eye information;
collecting the environment information of the environment in front of the user;
determining the device to be controlled based on the eye information and the environment information; and
controlling the device to be controlled.

12. The remote control method according to claim 11, wherein the environment information comprises the measurement distance between each of at the least one gazed device and the remote control device, and determining the device to be controlled based on the eye information and the environment information comprises:
determining the orientation of the eyeball based on the eye image, the orientation of the eyeball being characterized by the offset value of the current pupil position relative to the preset reference pupil position;
determining the direction of sight based on the orientation of the eyeball;
determining the device located in the direction of sight as the gazed device and obtaining the at least one gazed device;
determining the size of the pupil based on the eye image;
determining the gazing distance based on the size of the pupil; and
determining the device to be controlled in the at least one gazed device based on the gazing distance and the measurement distance between each of the at least one gazed device and the remote control device.

13. The remote control method according to claim 11, wherein the environment information comprises an environment image which comprises an image of the at least one gazed device, and wherein determining the device to be controlled based on the eye information and the environment information comprises steps as follows:
determining the orientation of the eyeball based on the eye image, the orientation of eyeball being characterized by the offset value of the current pupil position relative to the preset reference pupil position;
determining the direction of sight based on the orientation of the eyeball;
determining the device located in the direction of sight as the gazed device and obtaining the at least one gazed device;
determining the size of the pupil based on the eye image;
determining the gazing distance based on the size of the pupil;
determining the measurement distance between each of the at least one gazed device and the remote control device based on the environment image; and
determining the device to be controlled in the at least one gazed device based on the gazing distance and the measurement distance between each of the gazed device in the at least one gazed device and the remote control device.

14. The remote control method according to claim 12, wherein determining the device to be controlled in the at least one gazed device based on the gazing distance and the measurement distance between each of the gazed device in the at least one gazed device and the remote control device, comprises:
selecting one of the at least one gazed device whose measurement distance is closest to the gazing distance as the device to be controlled.

15. The remote control method according to claim 11, wherein before controlling the device to be controlled, the method further comprises:
collecting the user's verification information, the verification information being configured to verify a control right of the user to the device to be controlled; and
verifying the user based on the verification information; and
wherein controlling the device to be controlled comprises:
allowing control of the device to be controlled after the verification is successful.

16. The remote control method according to claim 11, wherein before controlling the device to be controlled, the method further comprises steps of:
- collecting the user's verification information, the verification information being configured to verify a control right of the user to the device to be controlled; and
- transmitting the verification information to the device to be controlled, such that the device to be controlled verifies the user based on the verification information; and wherein controlling the device to be controlled comprises:
- allowing control of the device to be controlled after the verification of the device to be controlled to the user is successful.

17. The remote control method according to claim 11, wherein before controlling the device to be controlled, the method further comprises:
- collecting the user's verification information, and the verification information is configured to verify a control right of the user to the device to be controlled; and
- transmitting the verification information to a verifying device, such that the verifying device verifies the user based on the verification information; and wherein controlling the device to be controlled comprises:
- allowing control of the device to be controlled after the verification of the verifying device to the user is successful.

18. The remote control method according to claim 11, wherein after determining the device to be controlled based on the eye information and the environment information, the method further comprises a step of:
- presenting information of the device to be controlled.

* * * * *